US012142952B2

(12) United States Patent
Peterson et al.

(10) Patent No.: US 12,142,952 B2
(45) Date of Patent: Nov. 12, 2024

(54) APPARATUS, METHODS, AND PROGRAM PRODUCTS FOR MANAGING POWER SHARING IN ELECTRONIC DEVICES

(71) Applicant: Lenovo (Singapore) Pte. Ltd., New Tech Park (SG)

(72) Inventors: Nathan Peterson, Oxford, NC (US); Russell Speight VanBlon, Raleigh, NC (US); Arnold Weksler, Raleigh, NC (US); Mark Delaney, Cary, NC (US); John C. Mese, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 495 days.

(21) Appl. No.: 17/497,112

(22) Filed: Oct. 8, 2021

(65) Prior Publication Data

US 2023/0112784 A1  Apr. 13, 2023

(51) Int. Cl.
*H02J 7/00* (2006.01)

(52) U.S. Cl.
CPC ....... *H02J 7/00034* (2020.01); *H02J 2310/22* (2020.01); *H02J 2310/48* (2020.01)

(58) Field of Classification Search
CPC ............... H02J 7/00034; H02J 2310/22; H02J 2310/48; H02J 7/342
See application file for complete search history.

(56) References Cited

U.S. PATENT DOCUMENTS

| 2016/0126779 | A1* | 5/2016 | Park | H02J 50/80 |
| | | | | 320/108 |
| 2017/0136894 | A1* | 5/2017 | Ricci | B60L 53/65 |
| 2018/0257505 | A1* | 9/2018 | Takatsuka | H02J 7/0045 |
| 2020/0067334 | A1* | 2/2020 | Fan | B60L 53/32 |
| 2021/0078433 | A1* | 3/2021 | Cha | B60L 53/65 |
| 2022/0348104 | A1* | 11/2022 | Brannan | G08G 1/137 |

* cited by examiner

*Primary Examiner* — Mong-Shune Chung
(74) *Attorney, Agent, or Firm* — Kunzler Bean & Adamson

(57) ABSTRACT

Apparatus, methods, and computer program products for managing power sharing in electronic devices are disclosed. One apparatus includes a processor and a memory that stores code executable by the processor to determine, in real-time, whether one or more first electronic devices that are compatible with a second electronic device that is low on power are within a predetermined geographic distance of the second electronic device and, in response to determining that one or more first electronic devices that are compatible with the second electronic device are within the predetermined geographic distance of the second electronic device, transmit a request to the one or more first electronic devices inquiring whether any of the one or more first electronic devices are willing to share power with the second electronic device. Methods and computer program products that include and/or perform the operations of the apparatus are also disclosed.

20 Claims, 18 Drawing Sheets

APPARATUS, METHODS, AND PROGRAM PRODUCTS FOR MANAGING POWER SHARING IN ELECTRONIC DEVICES

FIELD

The subject matter disclosed herein relates to electronic devices and more particularly relates to apparatus, methods, and program products that can manage power sharing in electronic devices.

DESCRIPTION OF THE RELATED ART

All electronic devices consume power while in use. When a portable electronic device becomes low on power, the electronic device can be simply plugged into a power source to recharge its battery. There are times, however, when a power source may not be readily available. For example, a power source may not be available for a personal portable electronic device when the user does not have access to a power source (e.g., cannot access a wall outlet, is present in a remote location (e.g., is camping), etc.) and/or forgets to bring a charging apparatus (e.g., an external battery, a charging cord, etc.).

Similar issues can arise with an electric vehicle since there are not enough electric vehicle charging stations for the increasing numbers of electric vehicles currently in use and/or contemporary electric vehicles are limited by range and charge times and. For example, during an extended trip, a driver may have to stop and wait in a line of other electric vehicles to use an electric vehicle charging station, may encounter a charging station that is experiencing a problem, and/or may encounter a charging station that uses a slow charging system. In each of these situations, the amount of time to complete an extended trip may be unnecessarily increased.

Some solutions the power issues discussed above include tethering two electronic devices together and sharing the power in one electronic device with the other electronic device. However, none of these solutions provide apparatus, methods, and program products that can manage power sharing in electronic devices.

BRIEF SUMMARY

Apparatus, methods, and computer program products for managing power sharing in electronic devices are disclosed. One apparatus includes a processor and a memory that stores code executable by the processor. The executable code causes the processor to determine, in real-time, whether one or more first electronic devices that are compatible with a second electronic device that is low on power are within a predetermined geographic distance of the second electronic device and, in response to determining that one or more first electronic devices that are compatible with the second electronic device are within the predetermined geographic distance of the second electronic device, transmit a request to the one or more first electronic devices inquiring whether any of the one or more first electronic devices are willing to share power with the second electronic device.

Also disclosed are methods for managing power sharing in electronic devices. One method includes determining, in real-time by a processor, whether one or more first electronic devices that are compatible with a second electronic device that is low on power are within a predetermined geographic distance of the second electronic device and transmitting a request to the one or more first electronic devices inquiring whether any of the one or more first electronic devices are willing to share power with the second electronic device in response to determining that the one or more first electronic devices that are compatible with the second electronic device are within the predetermined geographic distance of the second electronic device.

Computer program products including a computer-readable storage medium including code embodied therewith are further disclosed herein. The code is executable by a processor and causes the processor to determine, in real-time, whether one or more first electronic devices that are compatible with a second electronic device that is low on power are within a predetermined geographic distance of the second electronic device. The executable code further causes the processor to transmit a request to the one or more first electronic devices inquiring whether any of the one or more first electronic devices are willing to share power with the second electronic device in response to determining that the one or more first electronic devices that are compatible with the second electronic device are within the predetermined geographic distance of the second electronic device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
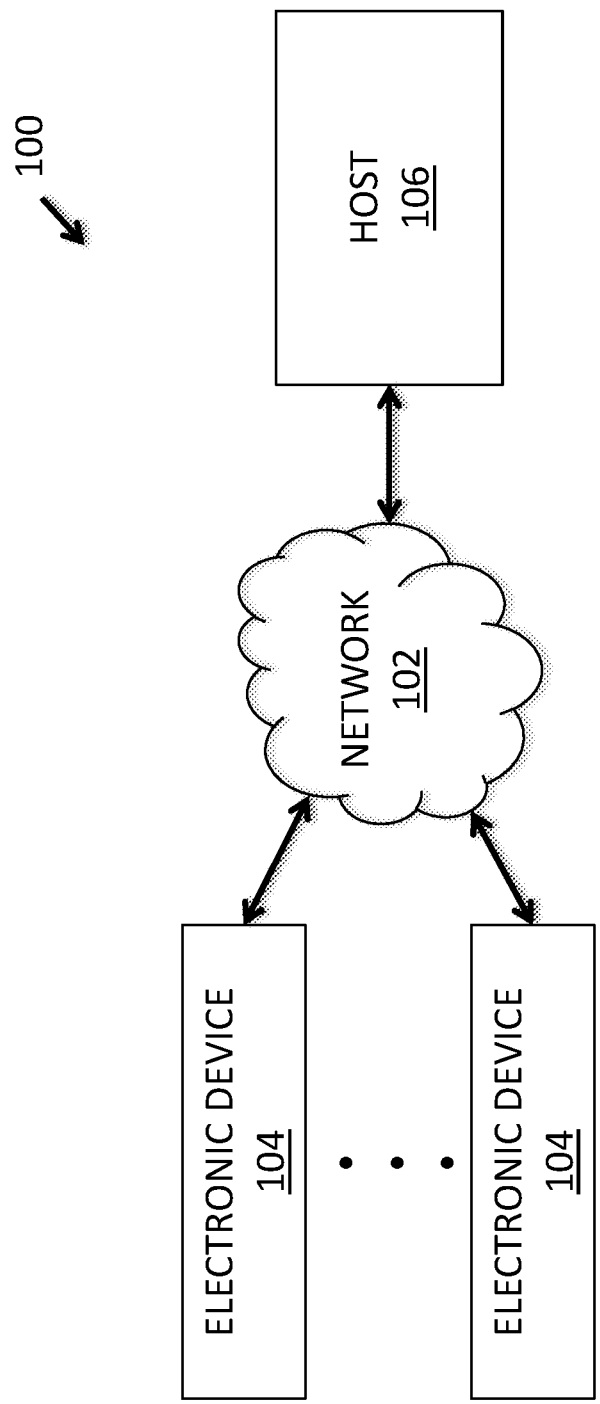
FIG. 1 is a schematic block diagram of one embodiment of a computing system that can manage power sharing in electronic devices.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a computing system 100 (and/or computing network 100) that can manage video filters and/or video feeds. At least in the illustrated embodiment, the computing system 100 includes, among other components, a network 102 connecting a set of two or more electronic devices 104 (also simply referred individually, in various groups, or collectively as electronic device(s) 104) and a host computing system 106 and/or host computing device 106 (or simply, host 106) to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of electronic devices 104 and the server 106 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., video conferencing) with one another that are possible and contemplated herein.

An electronic device 104 may include any suitable electronic system and/or electronic device capable of accessing and/or communicating with one another and with the host 106 via the network 102. Examples of an electronic device 104 include, but are not limited to, any vehicle that uses one or more batteries (e.g., an all-electric vehicle, a hybrid vehicle, and a fueled vehicle (e.g., a car, truck, bus, train, airplane, helicopter, ship/boat, submarine, motorcycle, bicycle, scooter, mobility scooter, and/or wheelchair, etc.)), a drone (e.g., a terrestrial drone, an aerial drone, and/or an aquatic drone, etc.), a robot (e.g., a terrestrial robot, an aerial robot, and/or an aquatic robot, etc.), a portable/mobile computing device or personal portable/mobile computing device (e.g., a laptop computer, a personal digital assistant (PDA), a tablet computer, a smart phone, a smart watch, a cellular telephone, a wearable, a fitness tracker, smart shoes, earbuds/headphones, an Internet of Things (IoT) device, a smart device, and/or a digital assistant, etc.), a private/non-commercial vehicle charging station/system/device, and/or a private/non-commercial device charging station/system/device, etc., among other electronic devices that are possible and contemplated herein.

Figure 2A:
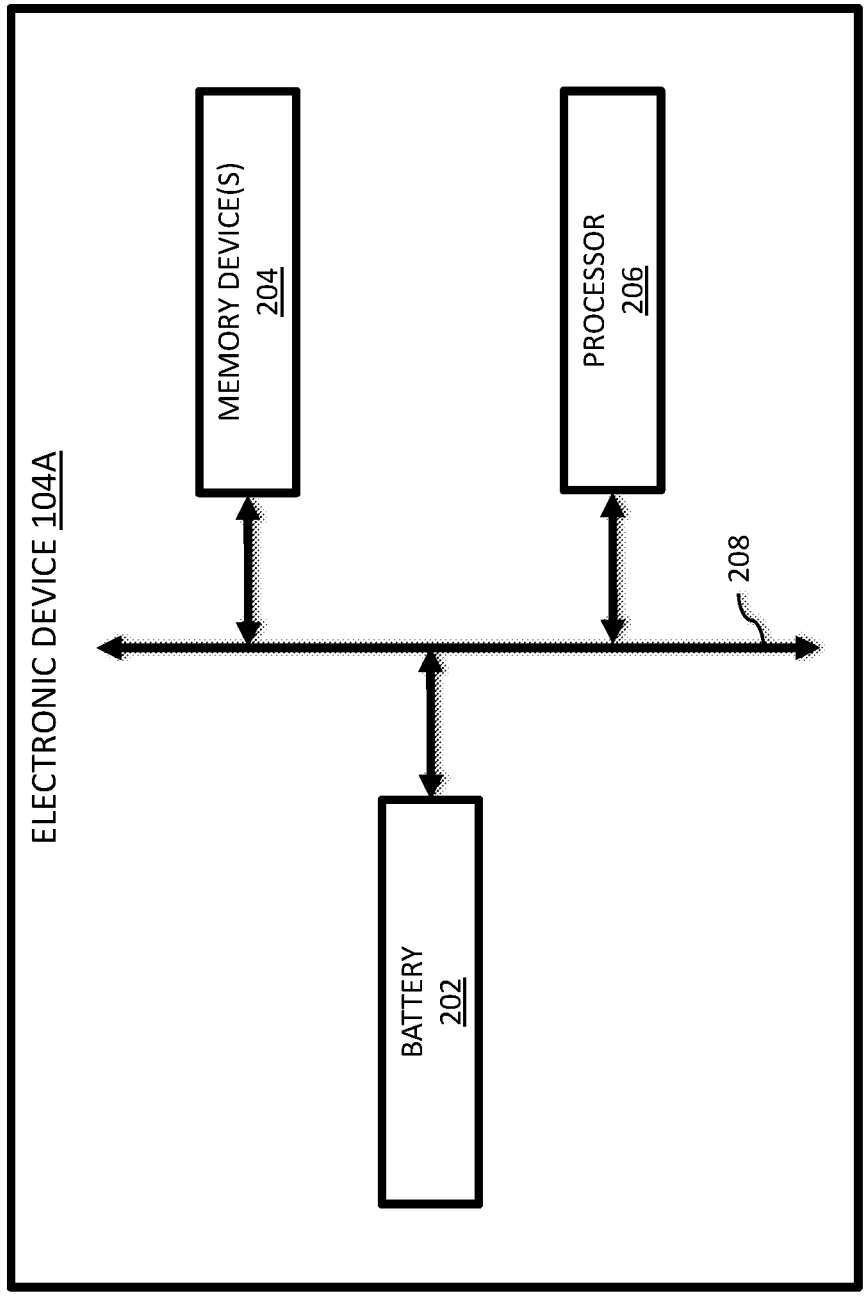
FIGS. 2A and 2B are schematic block diagrams of various embodiments of an electronic device included in the computing system of FIG. 1.

With reference to FIG. 2A, FIG. 2A is a block diagram of one embodiment of an electronic device 104. At least in the illustrated embodiment, the electronic device 104 includes, among other components, a battery 202, one or more memory devices 204, and a processor 206 coupled to and/or in communication with one another via a bus 208 (e.g., a wired and/or wireless bus).

A battery 202 may include any suitable device that is known or developed in the future capable of storing power for use by an electronic device 104. In various embodiments, the battery 202 includes a plurality of cells capable of storing and providing power to an electronic device 104. In some embodiments, the electronic device 104 includes more than one battery 202, which can be any suitable quantity of batteries 202.

A set of memory devices 204 may include any suitable quantity of memory devices 204. Further, a memory device 204 may include any suitable type of device and/or system that is known or developed in the future that can store computer-useable and/or computer-readable code. In various embodiments, a memory device 204 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 206).

A memory device 204, in some embodiments, includes volatile computer storage media. For example, a memory device 204 may include random access memory (RAM), including dynamic RAM (DRAM), synchronous dynamic RAM (SDRAM), and/or static RAM (SRAM). In other embodiments, a memory device 204 includes non-volatile computer storage media. For example, a memory device 204 may include a hard disk drive, a flash memory, and/or any other suitable non-volatile computer storage device that is known or developed in the future. In various embodiments, a memory device 204 includes both volatile and non-volatile computer storage media.

Figure 3A:
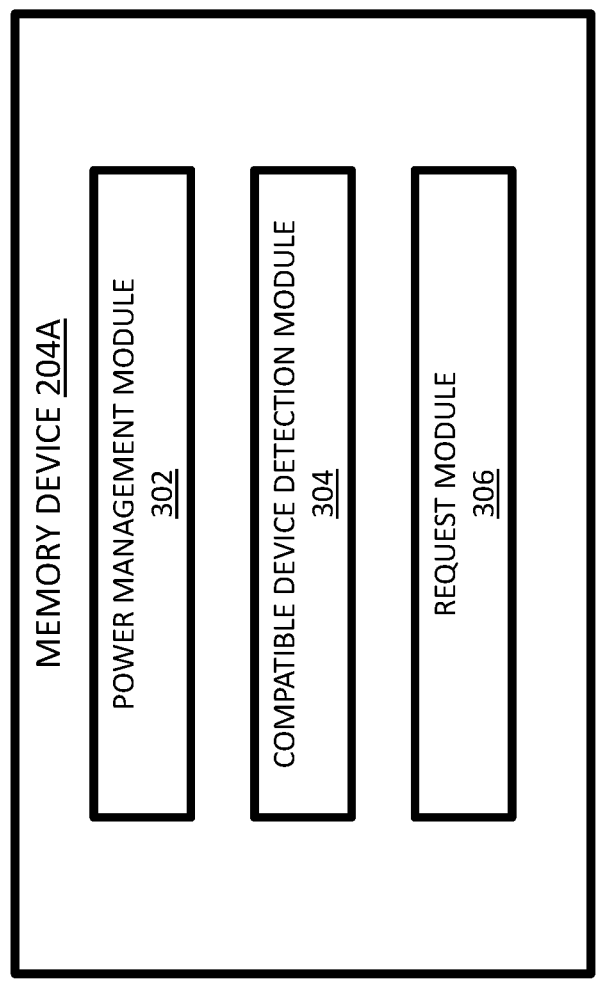
FIGS. 3A through 3C are schematic block diagrams of various embodiments of a memory device included in the electronic devices of FIGS. 2A and 2B.

With reference now to FIG. 3A, FIG. 3A is a schematic block diagram of one embodiment of a memory device 204A. At least in the illustrated embodiment, the memory device 204A includes, among other components, a power management module 302, a compatible device detection module 304, and a request module 306 that are each configured to operate/function in conjunction with one another when executed by the processor 206 to manage power sharing in the electronic devices 104.

A power management module 302 may include any suitable hardware and/or software that can manage power (and/or charge) in the battery 202. In various embodiments, the power management module 302 is configured to monitor, in real-time, the amount of power stored in the battery 202. Further, the power management module 302 is configured to detect and/or determine, in real-time, when the amount of power stored in the battery 202 is at and/or below a predetermined amount of power, which can be any suitable amount and/or percentage of power stored in a battery 202. In various embodiments, the predetermined amount and/or percentage of power may be utilized to indicate that the battery 202 is low on power and/or charge.

In certain embodiments, the power management module 302 is configured to automatically and/or automatedly notify, in real-time, a user of the electronic device 104 that the battery 202 is low on power (e.g., is at and/or below the predetermined amount of power or charge) in response to detecting/determining that the amount of power stored in the battery 202 is at and/or below the predetermined amount of power. In additional or alternative embodiments, the power management module 302 is configured to automatically and/or automatedly notify (e.g., transmit a signal and/or notification to), in real-time, a compatible device detection module 304 that the battery 202 is low on power (e.g., is at and/or below the predetermined amount of power or charge) in response to detecting/determining that the amount of power stored in the battery 202 is at and/or below the predetermined amount of power. In some embodiments, the notice includes that amount of power remaining in the battery 202, an amount of time left before the battery 202 is empty or out of charge, and/or a number of miles left before the battery 202 is empty or out of charge.

A compatible device detection module 304 may include any suitable hardware and/or software that can receive notices and/or notification signals from a power management module 302. Further, a compatible device detection module 304 may include any suitable hardware and/or software that can detect, locate, track, and/or identify other electronic devices 104 in the computing system 100 that are compatible with an electronic device 104 that is low on power in its battery/batteries 202.

A compatible device detection module 304 may utilize any suitable technology and/or technique that is known or developed in the future that can detect, locate, and/or track and/or facilitate detecting, locating, and/or tracking the location of electronic devices 104 in the computing system 100. Example technologies for detecting, locating, and/or tracking the location of the electronic devices 104 in the computing system 100 can include, but are not limited to, a Global Positioning System (GPS), a digital map, Bluetooth® technology, a Bluetooth® low energy (BLE) beacon system, a cellular telephone system, a WIFI system, a Short Message Service (SMS) system, the Internet, an Internet of Things (IoT) geolocation system, a Near-Field Communication (NFC) system, a radio frequency identification (RFID) system, a QR code system, a visual tracking system (e.g., a camera system, a traffic camera system, etc.), a Radio Detection and Ranging (RADAR) system, a Light Detection and Ranging (LiDAR) system, a Sound Navigation and Ranging (SONAR) system, a thermal tracking system (e.g., thermal imaging), an infrared (IR) tracking system, a time of flight system, a structured light system, and/or a Raspberry Pi tracking system, etc., among other technologies and/or techniques that are possible and contemplated herein.

In some embodiments, the compatible device detection module 304 is configured to define a geographic area for searching and locating compatible electronic devices 104. In various embodiments, the defined geographic area includes the compatible device detection module 304 searching for and/or locating compatible electronic devices 104 within a predetermined distance and/or radius (simply referred to herein as, predetermined distance) of an electronic device 104 that is low on power in its battery 202.

In certain embodiments, the predetermined distance is a fixed distance. In additional or alternative embodiments, the predetermined distance is not fixed and can be dependent on, for example, the amount of power left in a battery 202, the amount or estimated amount of time before a battery 202 is out of power, and/or the amount or estimated number of miles before a battery 202 is out of power.

In various embodiments, the compatible device detection module 304 is configured to identify which, if any, electronic device(s) 104 located within the predetermined distance is/are compatible with an electronic device 104 that is low on power in its battery 202. In other words, the compatible device detection module 304 is configured to determine whether any of the located electronic devices 104 is/are capable of sharing power with and/or providing power to an electronic device 104 that is low on power. Here, a compatible electronic device 104 can include the same type and/or brand of electronic device 104, a charging station and/or charging system for the type and/or brand of electronic device 104, an electronic device 104 that is modified/modifiable for sharing/providing power to a type and/or brand of electronic device 104, and/or a charging station and/or system that is modified/modifiable for sharing/providing power to a type and/or brand of electronic device 104, etc., among other compatibilities that are possible and contemplated herein that can share/provide power to a type and/or brand of electronic device 104.

In certain embodiments, the compatible device detection module 304 is configured to automatically and/or automatedly notify, in real-time, a user of the electronic device 104 that one or more compatible electronic devices 104 are within the predetermined distance. In various embodiments, the notification includes information about each of the compatible electronic devices 104. In certain embodiments, the information about the compatible electronic device(s) 104 can include, but is not limited to, the distance that the user's electronic device 104 is away from each compatible electronic device 104, the location of each compatible electronic device 104, directions to each compatible electronic device 104, the type of electronic device 104, a rating for the owner/user of each compatible electronic device 104, a cost to obtain power from each compatible electronic device 104, and/or the compatible electronic devices 104 displayed in an order in accordance with a ranking/rating system (e.g., ease of use, user/owner rating, ease of access, cost, distance, etc.), etc., among other information that is possible and contemplated herein.

In some embodiments, the user of the electronic device 104 that is low on battery power is able to provide a selection to the compatible device detection module 304 of which compatible electronic device(s) 104 to contact and request power sharing services and/or an order of which compatible electronic device(s) 104 to contact and request power sharing services. In other embodiments, the compatible device detection module 304 is configured to select a compatible electronic device 104 to contact and request power sharing services from, which selection can be based on any predefined and/or predetermined order and/or criteria/criterion (e.g., distance, cost, rating, ranking, ease of use, and/or location, etc.).

The compatible device detection module 304, in various embodiments, is further configured to transmit a notification to a request module 306 in response to a compatible electronic device 104 being selected. The notification can identify the selected compatible electronic device(s) 104 and/or the order in which to contact the electronic device(s) 104 to request power sharing services.

A request module 306 may include any suitable hardware and/or software that can receive notifications from a compatible device detection module 304. The request module 306 may further include any suitable hardware and/or software that can transmit requests for power sharing services to compatible electronic devices 104.

In various embodiments, the request module 306 is configured to transmit a request (and/or a ping) for power sharing services to one or more selected compatible electronic devices 104. In certain embodiments, the request module 306 is configured to transmit the requests for power sharing services to multiple selected compatible electronic devices 104 in a predetermined order, as selected by the user or the compatible device detection module 304.

A request for power sharing services may convey the desire of an electronic device 104 that is low on power to obtain power from the selected compatible electronic device 104 and inquire as to the availability and/or willingness of the owner/user of the selected compatible electronic device 104 to share power with the electronic device 104 that is low on power. The request may further inquire as to the cost of and/or the compensation needed for the selected compatible electronic device 104 to perform the power sharing services, which can be a predetermined/flat amount and/or may be dependent on one or more other factors (e.g., amount of power shared, time of day, amount of time consumed to share power, location, type and/or brand of electronic device 104 sharing power, type and/or brand of electronic device 104 receiving, power etc.).

Figure 3B:
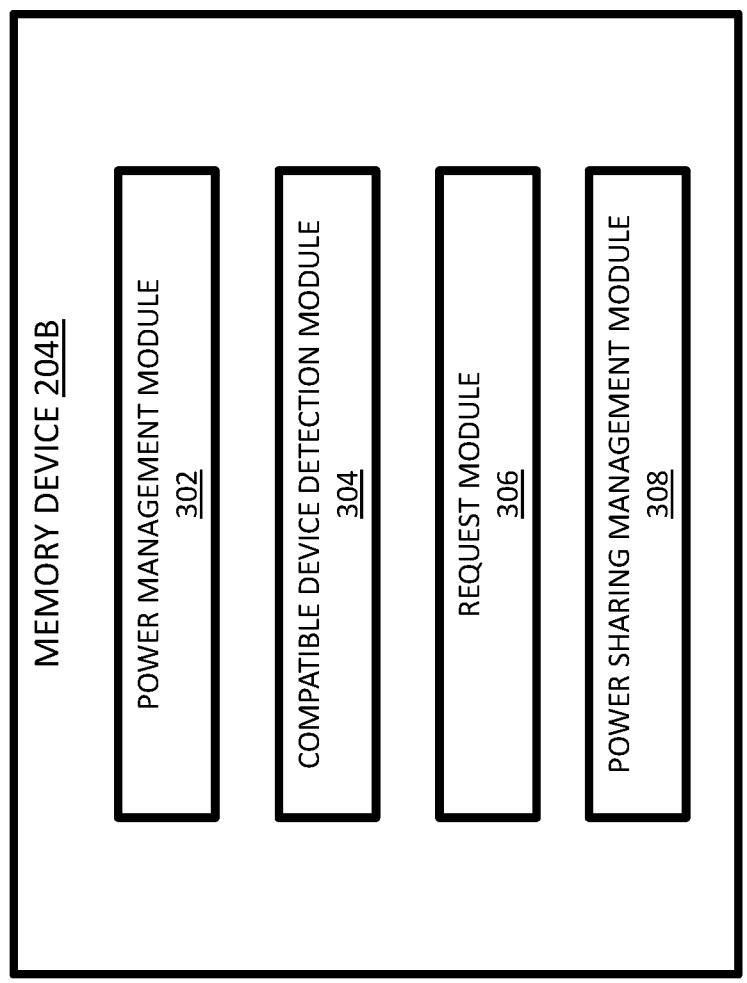

Referring now to FIG. 3B, FIG. 3B is a block diagram of another embodiment of a memory device 204B. The memory device 204B includes a power management module 302, a compatible device detection module 304, and a request module 306 similar to the power management module 302, compatible device detection module 304, and request module 306 included in the memory device 204A discussed elsewhere herein. At least in the illustrated embodiment, the memory device 204B further includes, among other components, a power sharing management module 308.

A power sharing management module 308 may include any suitable hardware and/or software that can receive responses to requests for power sharing services from selected compatible electronic devices 104. A response can include an indication of the availability and/or willingness of the owner/user of the selected compatible electronic device 104 to share power with the electronic device 104 that is low on power.

In various embodiments, the power sharing management module 308 is configured to further communicate with a selected compatible electronic device 104 in response to receiving a response (e.g., a positive response) from a selected compatible electronic device 104 that indicates that the selected compatible electronic device 104 is available and/or is willing to share power and/or perform power sharing services with the electronic device 104 that is low on power. The further communications, in some embodiments, can include one or more further agreements and/or further information that can include, in non-limiting examples, mutually agreeing to a geographic meeting location, directions to the geographic meeting location, instructions for operating the selected compatible electronic device 104, instructions for performing the power sharing services, an amount of power to be shared/provided by the selected compatible electronic device 104, an amount of power to be obtained by the electronic device 104 that is low on power, the cost/compensation for performing the power sharing services, payment information, and/or cost/compensation for having performed the power sharing services, etc., among other agreements and/or information that can be further communicated between the selected compatible electronic device 104 and the electronic device 104 that is low on power.

As discussed above, a positive response from a selected compatible electronic device 104 can include one or more further agreements and/or further information between the power sharing management module 308, the user of the electronic device 104 that is low in power, the user of the selected compatible electronic device 104, and/or the selected compatible electronic device 104. However, one or more of the power sharing management module 308, the user of the electronic device 104 that is low in power, the user of the selected compatible electronic device 104, and/or the selected compatible electronic device 104 may not agree to one or more of the further items/terms/agreements that may be included in the further communications. For example, the parties may not agree upon a geographic meeting location, the instructions for operating the selected compatible electronic device 104 may be too complex/difficult, the amount of power to be shared/provided by the selected compatible electronic device is too small, the minimum amount of power to be shared/provided by the selected compatible electronic device is too large, the electronic device 104 that is low on power is requesting too much power, the electronic device 104 that is low on power is not requesting enough power, the user of the electronic device 104 that is low on power has insufficient funds and/or unsuitable/non-usable forms of payment/compensation, and/or the transaction cost is too high, etc., among other reasons for not reaching an agreement that are possible and contemplated herein. In some embodiments, the user of the electronic device 104 that is low on power and/or the power sharing management module 308 can be presented with the terms for providing the power sharing services that the owner/user of the selected compatible electronic device 104 is requesting prior to agreeing to the power sharing services. Here, the user of the electronic device 104 that is low on power and/or the power sharing management module 308 can decline to enter an agreement for power sharing services.

In certain embodiments, the power sharing management module 308, in response to declining to enter an agreement for power sharing services with a selected compatible electronic device 104 and/or is declined by the selected compatible electronic device 104, is configured to wait for responses from one or more other selected compatible electronic devices 104 (e.g., one or more subsequently and/or alternatively selected compatible electronic devices 104) and communicate with the other selected compatible electronic device(s) 104 until an agreement for power sharing services is reached with a selected compatible electronic device 104, as discussed elsewhere herein, which can take one or more additional iterations of their respective operations/functions. In additional or alternative embodiments, the power sharing management module 308 is configured to notify the compatible device detection module 304 that an agreement for performing power sharing services has not been reached with a selected compatible electronic device 104 in response to declining to enter and/or being declined for an agreement for power sharing services with the selected compatible electronic device 104. Here, the compatible device detection module 304, the request module 306, and/or the power sharing management module 308 can perform their respective operations and/or functions, as discussed elsewhere herein, until an agreement is reached with a compatible electronic device 104 that is available and/or willing to perform the power sharing services is located and performed, which can take one or more additional iterations of their respective operations and/or functions.

The power sharing management module 308, in some embodiments, is configured to wait for responses from other selected compatible electronic devices 104 (e.g., one or more subsequently and/or alternatively selected compatible electronic devices 104) in response to receiving a response (e.g., a negative response) from a first or initially selected compatible electronic device 104 that indicates that the selected compatible electronic device 104 (e.g., a first/initially selected compatible electronic device 104) is unavailable for power sharing services and/or is unwilling to share power with the electronic device 104 that is low on power. The power sharing management module 308 can receive responses from the subsequently/alternatively selected compatible electronic devices 104 until a compatible electronic device 104 (e.g., a subsequently/alternatively selected compatible electronic device 104) that is available and/or willing to perform power sharing services is located and performed, as discussed elsewhere herein, which can take one or more further iterations of their respective operations/functions.

In additional or alternative embodiments, the power sharing management module 308 is configured to notify the compatible device detection module 304 that the first/initially and/or one or more subsequently/alternatively selected compatible electronic device 104 is unavailable for power sharing services and/or is unwilling to share power with the electronic device 104 that is low on power in response to receiving a negative response from the first/initially selected compatible electronic device 104 and/or the subsequently/alternatively selected compatible electronic device(s) 104. Here, the compatible device detection module 304, the request module 306, and/or the power sharing management module 308 can perform their respective operations and/or functions, as discussed elsewhere herein, until a compatible electronic device 104 (e.g., a subsequently/alternatively selected compatible electronic device 104) that is available and/or willing to perform power sharing services is located and performed, which can take one or more further iterations of their respective operations/functions.

The power sharing management module 308, in various embodiments, is configured to notify the user the user of the selected compatible electronic device 104 when the power sharing services provided by the selected compatible electronic device 104 are complete. The power sharing management module 308 can be further configured to notify the user of the electronic device 104 that is (was) low on power and/or the user of the selected compatible electronic device 104 that payment/compensation (e.g., money, credits, etc.) is due to the user of the selected compatible electronic device 104 and/or that payment/compensation has been provided to the user of the selected compatible electronic device 104.

In some embodiments, the power sharing management module 308 is configured to receive positive responses from two or more compatible electronic devices 104 (e.g., receive two or more positive responses). Here, the power sharing management module 308 can select which compatible electronic device 104 to use for power sharing services and/or can present the two or more compatible electronic devices 104 to a user and receive a selection of which compatible electronic device 104 to use for power sharing services.

Figure 3C:
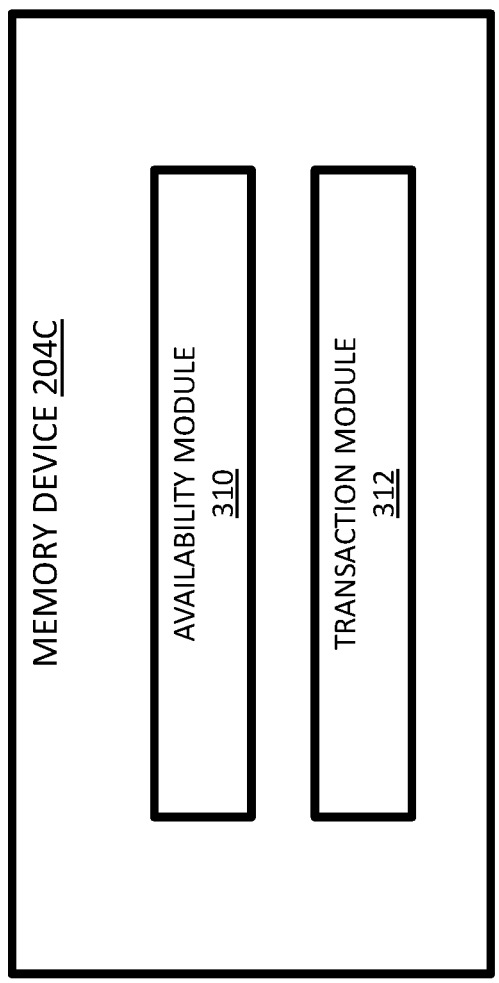

With reference to FIG. 3C, FIG. 3C is a block diagram of another embodiment of a memory device 204C. At least in the illustrated embodiment, the memory device 204C includes, among other components, an availability module 310 and a transaction module 312.

An availability module 310 may include any suitable hardware and/or software that can determine whether an electronic device 104 (e.g., a selected compatible electronic device 104) is available and/or willing to share power and/or perform power sharing services with another electronic device 104 (e.g., an electronic device 104 that is low on power). In some embodiments, the availability module 310 is configured to determine whether the electronic device 104 can satisfy the needs (e.g., amount of power, timing, distance, cost, etc.) of a requesting electronic device 104.

In various embodiments, the availability module 310 is configured to make the determination in response to receiving a request from an electronic device 104 that is low on power. The availability module 310 is further configured to transmit its determined availability to the electronic device 104 that is low on power in response to making the determination.

A transaction module 312 may include any suitable hardware and/or software that can further communicate with an electronic device 104 that is low on power, as discussed elsewhere herein. In some embodiments, the transaction module 312 is configured to determine whether to agree to share power and/or provide power sharing services with an electronic device 104 that is low on power based on one or more terms/agreements included in the further communication with the electronic device 104 that is low on power.

The transaction module 312 can agree to enter or decline to enter into an agreement to share power and/or provide power sharing services with an electronic device 104 that is low on power based on any suitable factors and/or criteria/criterion. In various embodiments, the transaction module 312 is configured to transmit an acceptance or rejection to the electronic device 104 that is low on power in response to making its determination.

In some embodiments (e.g., a charging station), the electronic device 104 includes the availability module 310 and the transaction module 312. In other embodiments (e.g., a mobile electronic device 104), an electronic device 104 can include, in addition to the availability module 310 and the transaction module 312, others of the power management module 302, compatible device detection module 304, request module 306, and/or power sharing management module 308.

Referring back to FIG. 2A, a processor 206 may include any suitable non-volatile/persistent hardware and/or software configured to perform and/or facilitate performing functions and/or operations for managing power sharing in electronic devices 104. In various embodiments, the processor 206 includes hardware and/or software for executing instructions in one or more modules and/or applications that can perform and/or facilitate performing functions and/or operations for managing power sharing in electronic devices 104. The modules and/or applications executed by the processor 206 for managing power sharing in electronic devices 104 can be stored on and executed from a memory device 204 and/or from the processor 206.

Figure 4A:
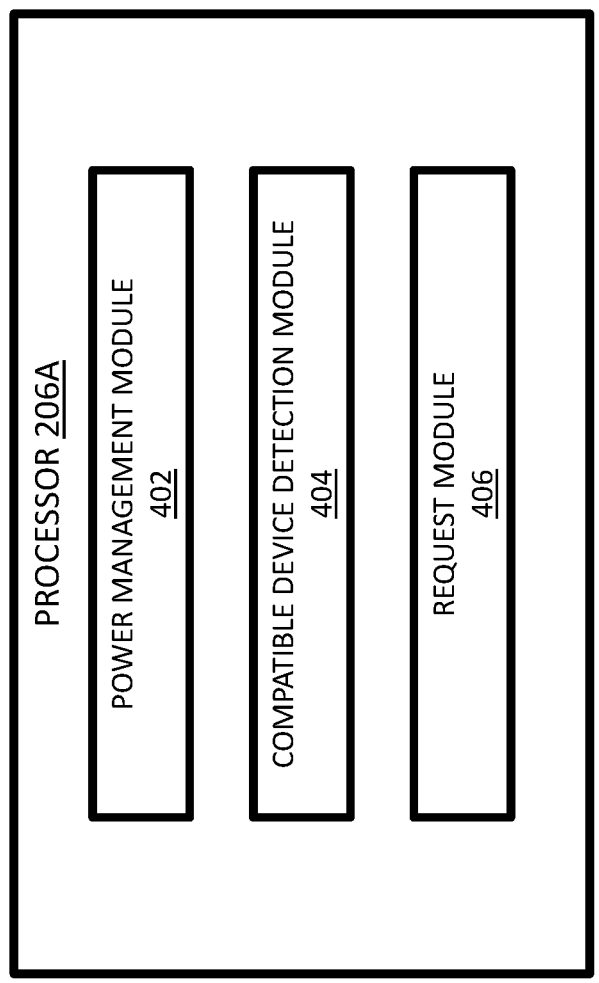
FIGS. 4A through 4C are schematic block diagrams of various embodiments of a processor included in the electronic devices of FIGS. 2A and 2B.

With reference to FIG. 4A, FIG. 4A is a schematic block diagram of one embodiment of a processor 206A. At least in the illustrated embodiment, the processor 206A includes, among other components, a power management module 402, a compatible device detection module 404, and a request module 406 similar to the power management module 302, compatible device detection module 304, and request module 306 in the memory device 204A discussed with reference to FIG. 3A.

Figure 4B:
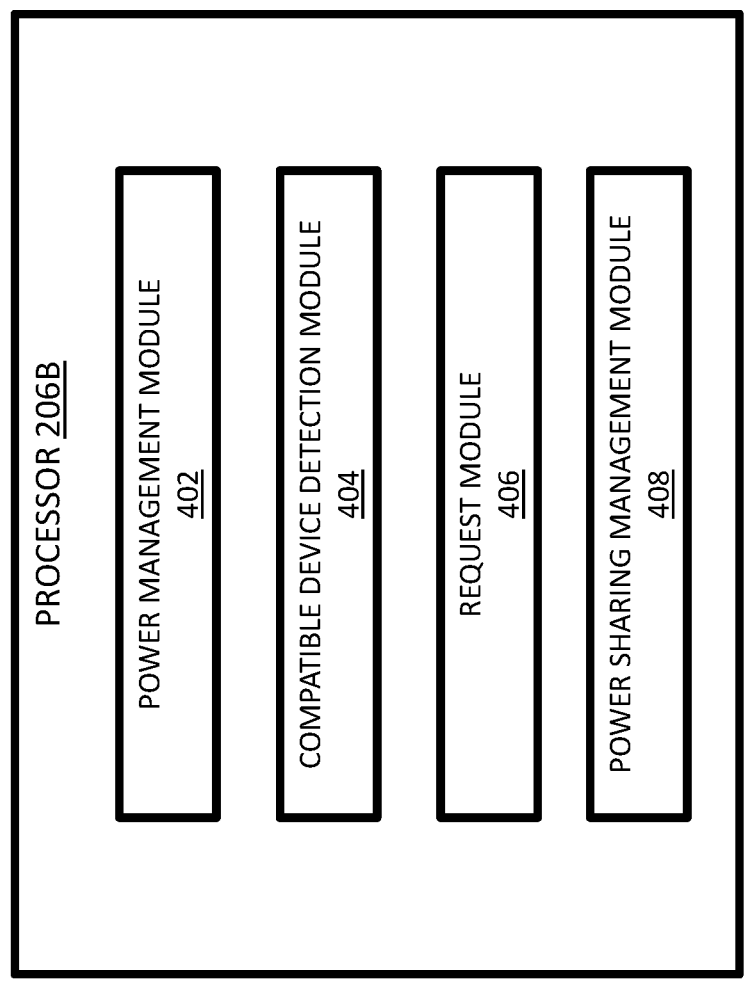

Referring to FIG. 4B, FIG. 4B is a schematic block diagram of another embodiment of a processor 206B. At least in the illustrated embodiment, the processor 206B includes, among other components, a power management module 402, a compatible device detection module 404, a request module 406, and a power sharing management module 408 similar to the power management module 302, compatible device detection module 304, request module 306, and power sharing management module 308 in the memory device 204B discussed with reference to FIG. 3B.

Figure 4C:
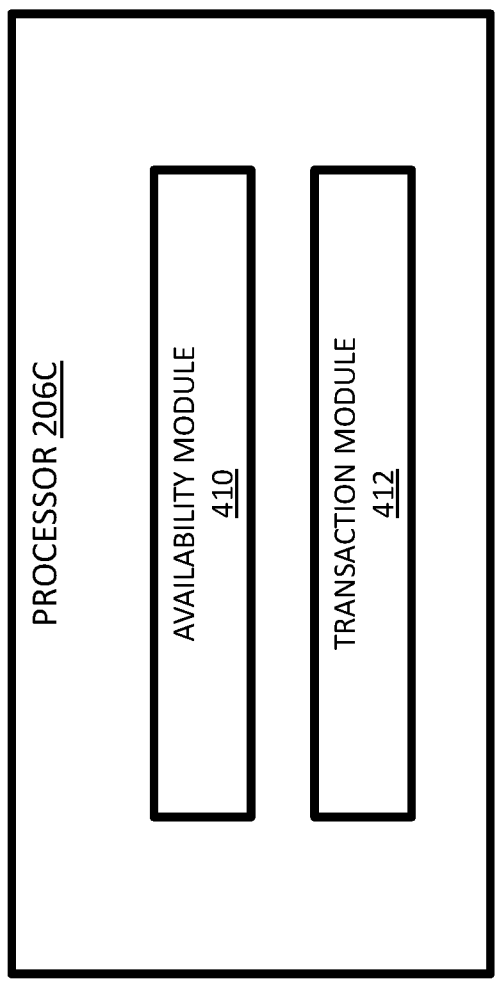

With reference to FIG. 4C, FIG. 4C is a schematic block diagram of another embodiment of a processor 206C. At least in the illustrated embodiment, the processor 206C includes, among other components, an availability module 410 and a transaction module 412 similar to the availability module 310 and the transaction module 312 in the memory device 204C discussed with reference to FIG. 3C.

In some embodiments (e.g., a charging station), the electronic device 104 includes the availability module 410 and the transaction module 412. In other embodiments (e.g., a mobile electronic device 104), an electronic device 104 can include, in addition to the availability module 410 and the transaction module 412, others of the power management module 402, compatible device detection module 404, request module 406, and/or power sharing management module 408.

Figure 2B:
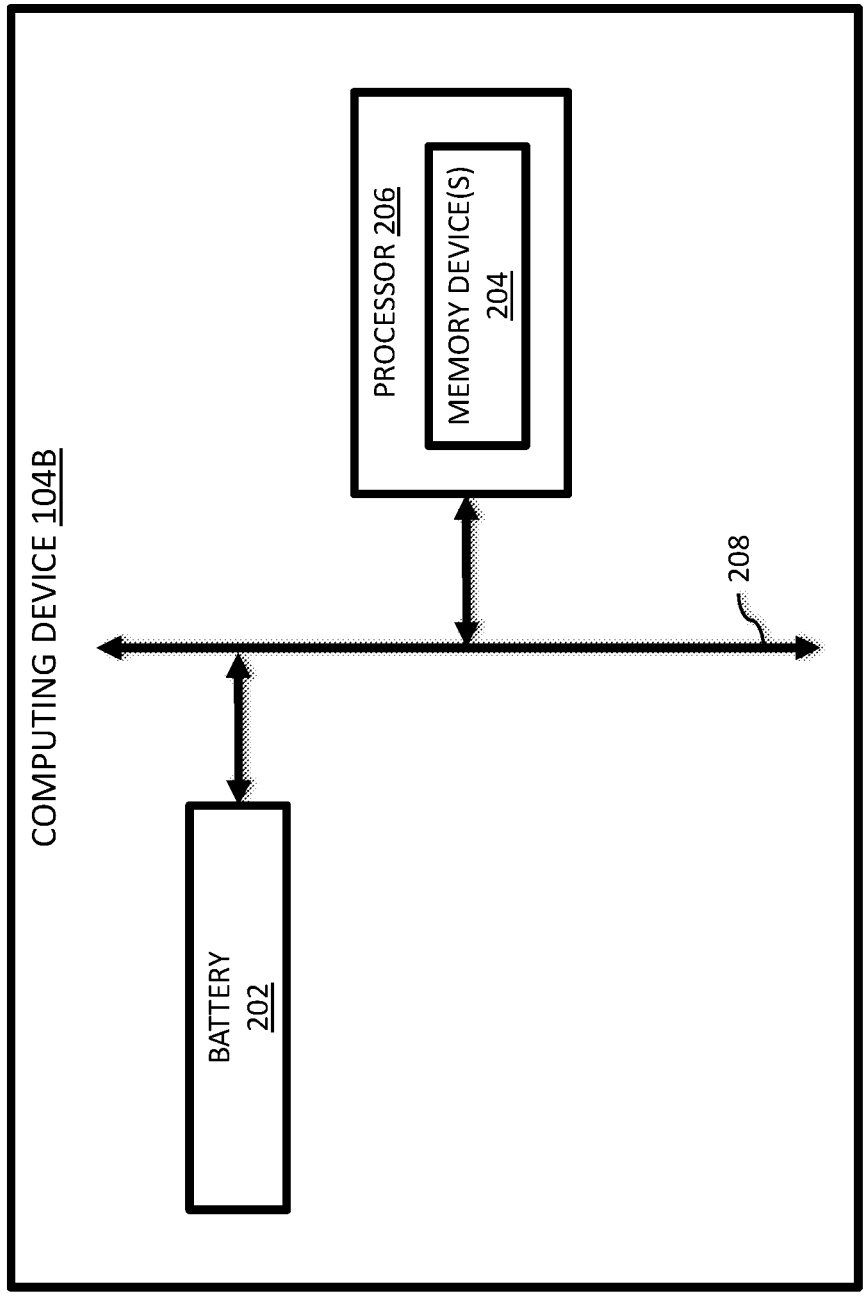

Turning now to FIG. 2B, FIG. 2B is a block diagram of another embodiment of an electronic device 104B. The electronic device 104B includes, among other components, a battery 202, one or more memory devices 204, and a processor 206 similar to the electronic device 104A discussed elsewhere herein. Alternative to the electronic device 104A, the processor 206 in the electronic device 104B includes the memory device 204 as opposed to the memory device 204 of the electronic device 104A being a different device than and/or independent of the processor 206.

With reference again to FIG. 1, a host 106 may include any suitable computer hardware and/or software that can provide power sharing host operations. In various embodiments, a host computing device 106 can include one or more processors, computer-readable memory, and/or one or more interfaces, among other features and/or hardware. A host computing device 106 can further include any suitable software component or module, or computing device(s) that is/are capable of hosting and/or serving a software application or services, including distributed, enterprise, and/or cloud-based software applications, data, and services. For instance, a host computing device 106 can be configured to host, serve, or otherwise manage power sharing services for electronic devices 104, or applications interfacing, coordinating with, or dependent on or used by other services, including power sharing applications and software tools for managing power sharing in electronic devices 104. In some instances, a host 106 can be implemented as some combination of devices that can comprise a common computing system and/or device, server, server pool, or cloud computing environment and share computing resources, including shared memory, processors, and interfaces.

Figure 5A:
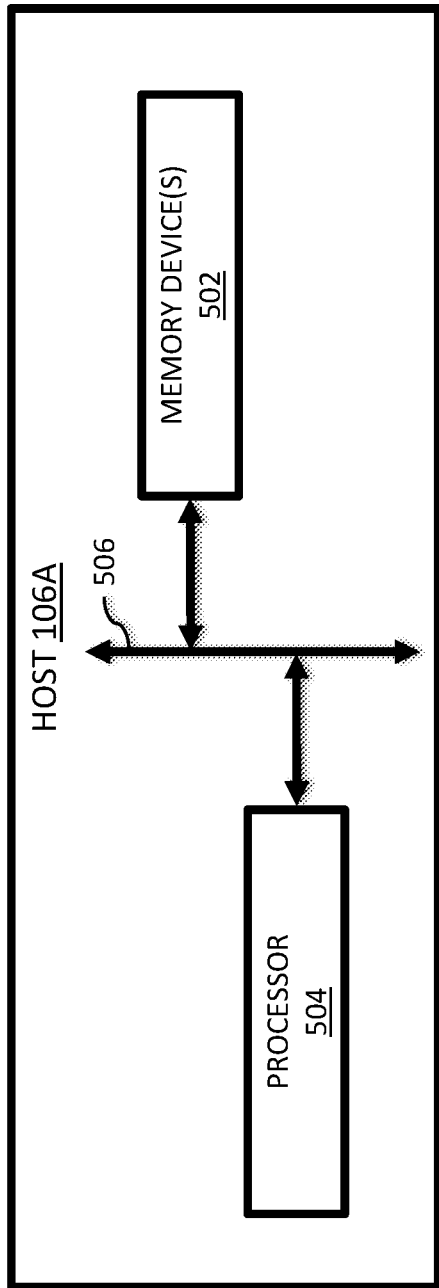
FIGS. 5A and 5B are schematic block diagrams of various embodiments of a host included in the computing system of FIG. 1.

Referring to FIG. 5A, FIG. 5A is a block diagram of one embodiment of a host 106A. At least in the illustrated embodiment, the host 106A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 6A:
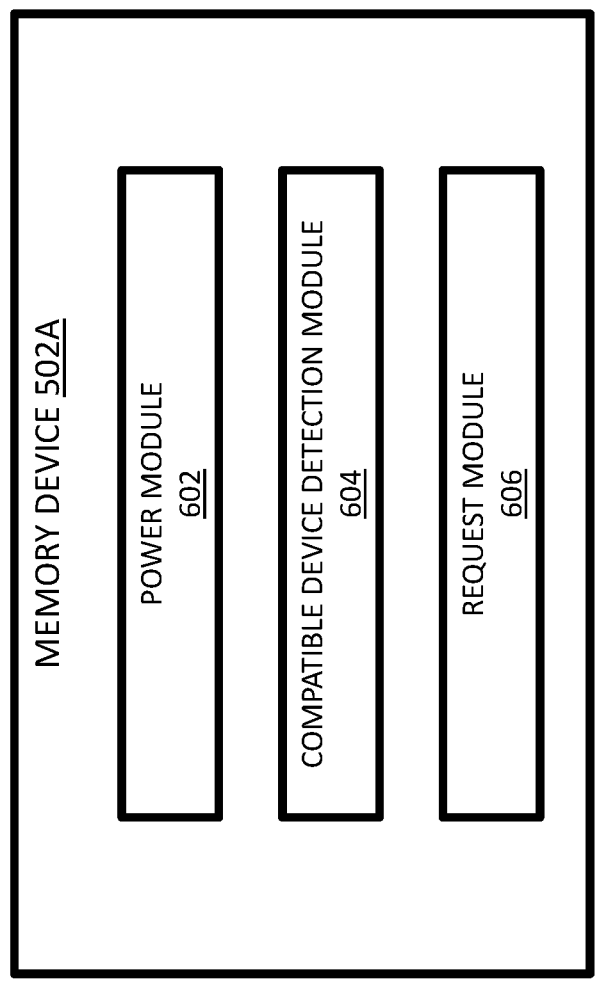
FIGS. 6A and 6B are schematic block diagrams of various embodiments of a memory device included in the hosts of FIGS. 5A and 5B.

With reference now to FIG. 6A, FIG. 6A is a schematic block diagram of one embodiment of a memory device 502A. At least in the illustrated embodiment, the memory device 502A includes, among other components, a power management module 602. The memory device 502A further includes a compatible device detection module 604 and a request module 606 similar to the compatible device detection module 404 and the request module 406 discussed above with reference to the processor 206A illustrated in FIG. 4A.

A power management module 602 may include any suitable hardware and/or software that can manage power in the battery 202 of an electronic device 104. In various embodiments, the power management module 602 is configured to monitor, in real-time, the amount of power stored in the battery 202 of an electronic device 104. Further, the power management module 602 is configured to detect and/or determine, in real-time, when the amount of power stored in the battery 202 of an electronic device 104 is at and/or below a predetermined amount of power, which can be any suitable amount and/or percentage of power stored in a battery 202. In additional or alternative embodiments, the power management module 602 is configured to receive a notification from an electronic device 104 that its battery 202 is low on power (e.g., is at and/or below the predetermined amount of power or charge). In certain embodiments, the predetermined amount and/or percentage of power may be utilized to indicate that the battery 202 is low on power and/or charge.

In various embodiments, the power management module 602 is configured to automatically and/or automated) y notify (e.g., transmit a signal and/or notification to), in real-time, a compatible device detection module 604 that the battery 202 of an electronic device 104 is low on power (e.g., is at and/or below the predetermined amount of power or charge) in response to detecting/determining that the amount of power stored in the battery 202 is at and/or below the predetermined amount of power and/or in response to receiving a notification from the electronic device 104 that its battery 202 is low on power. In some embodiments, the notice to the compatible device detection module 604 includes that amount of power remaining in the battery 202, an amount of time left before the battery 202 is empty or out of charge, and/or a number of miles left before the battery 202 is empty or out of charge.

A compatible device detection module 604 may include any suitable hardware and/or software that can receive notices and/or notification signals from a power management module 602. Further, a compatible device detection module 604 may include any suitable hardware and/or software that can detect, locate, track, and/or identify electronic devices 104 in the computing system 100 that are compatible with an electronic device 104 that is low on power in its battery/batteries 202.

A compatible device detection module 604 may utilize any suitable technology and/or technique that is known or developed in the future that can detect, locate, and/or track and/or facilitate detecting, locating, and/or tracking the location of electronic devices 104 in the computing system 100, as discussed elsewhere herein. In some embodiments, the compatible device detection module 604 is configured to define a geographic area for searching and locating compatible electronic devices 104. In various embodiments, the defined geographic area includes the compatible device detection module 604 searching for and/or locating compatible electronic devices 104 within a predetermined distance and/or radius (simply referred to herein as, predetermined distance) of an electronic device 104 that is low on power in its battery 202.

In certain embodiments, the predetermined distance is a fixed distance. In additional or alternative embodiments, the predetermined distance is not fixed and can be dependent on, for example, the amount of power left in a battery 202, the amount or estimated amount of time before a battery 202 is out of power, and/or the amount or estimated number of miles before a battery 202 is out of power.

In various embodiments, the compatible device detection module 604 is configured to identify which, if any, electronic device(s) 104 located within the predetermined distance of an electronic device 104 that is low on power is/are compatible with the electronic device 104 that is low on power. In other words, the compatible device detection module 604 is configured to determine whether any of the located electronic devices 104 is/are capable of sharing power with and/or providing power to an electronic device 104 that is low on power. Here, a compatible electronic device 104 can include the same type and/or brand of electronic device 104, a charging station and/or charging system for the type and/or brand of electronic device 104, an electronic device 104 that is modified/modifiable for sharing/providing power to a type and/or brand of electronic device 104, and/or a charging station and/or system that is modified/modifiable for sharing/providing power to a type and/or brand of electronic device 104, etc., among other compatibilities that are possible and contemplated herein that can share/provide power to a type and/or brand of electronic device 104, as the electronic device 104 that is low on power.

In certain embodiments, the compatible device detection module 604 is configured to automatically and/or automatedly notify, in real-time, a user of the electronic device 104 that one or more compatible electronic devices 104 are within the predetermined distance. In various embodiments, the notification includes information about each of the compatible electronic devices 104. In certain embodiments, the information about the compatible electronic device(s) 104 can include, but is not limited to, the distance that the user's electronic device 104 is away from each compatible electronic device 104, the location of each compatible electronic device 104, directions to each compatible electronic device 104, the type of electronic device 104, a rating for the owner/user of each compatible electronic device 104, a cost to obtain power from each compatible electronic device 104, and/or the compatible electronic devices 104 displayed in an order in accordance with a ranking/rating system (e.g., ease of use, user/owner rating, ease of access, cost, distance, etc.), etc., among other information that is possible and contemplated herein.

In some embodiments, the user of the electronic device 104 that is low on battery power is able to provide a selection to the compatible device detection module 304 of which compatible electronic device(s) 104 to contact and request power sharing services and/or an order of which compatible electronic device(s) 104 to contact and request power sharing services. In other embodiments, the compatible device detection module 304 is configured to select a compatible electronic device 104 to contact and request power sharing services from, which selection can be based on any predefined and/or predetermined order and/or criteria/criterion (e.g., distance, cost, rating, ranking, ease of use, and/or location, etc.).

The compatible device detection module 604, in various embodiments, is further configured to transmit a notification to a request module 606 in response to a compatible electronic device 104 being selected. The notification can identify the selected compatible electronic device(s) 104 and/or the order in which to contact the electronic device(s) 104 to request power sharing services.

A request module 606 may include any suitable hardware and/or software that can receive notifications from a compatible device detection module 604. The request module 606 may further include any suitable hardware and/or software that can transmit requests for power sharing services to compatible electronic devices 104.

In various embodiments, the request module 606 is configured to transmit a request (and/or a ping) for power sharing services to one or more selected compatible electronic devices 104. In certain embodiments, the request module 606 is configured to transmit the requests for power sharing services to multiple selected compatible electronic devices 104 in a predetermined order, as selected by the user or the compatible device detection module 604.

A request for power sharing services may convey the desire of an electronic device 104 that is low on power to obtain power from the selected compatible electronic device 104 and inquire as to the availability and/or willingness of the owner/user of the selected compatible electronic device 104 to share power with the electronic device 104 that is low on power. The request may further inquire as to the cost of and/or the compensation needed for the selected compatible electronic device 104 to perform the power sharing services, which can be a predetermined/flat amount and/or may be dependent on one or more other factors (e.g., amount of power shared, time of day, amount of time consumed to share power, location, type and/or brand of electronic device 104 sharing power, type and/or brand of electronic device 104 receiving, power etc.).

Figure 6B:
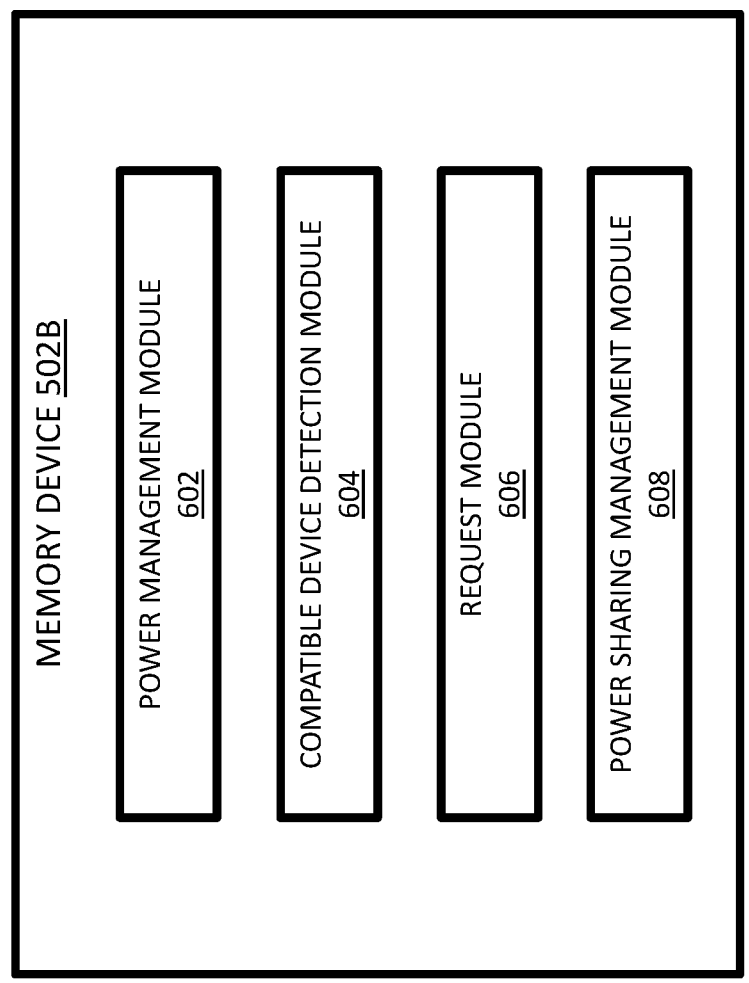

Referring now to FIG. 6B, FIG. 6B is a block diagram of another embodiment of a memory device 502B. The memory device 502B includes a power management module 602, a compatible device detection module 604, and a request module 606 similar to the power management module 602, compatible device detection module 604, and request module 606 included in the memory device 502A discussed elsewhere herein. At least in the illustrated embodiment, the memory device 502B further includes, among other components, a power sharing management module 608.

A power sharing management module 608 may include any suitable hardware and/or software that can receive responses to requests for power sharing services from selected compatible electronic devices 104. A response can include an indication of the availability and/or willingness of the owner/user of the selected compatible electronic device 104 to share power with the electronic device 104 that is low on power.

In various embodiments, the power sharing management module 608 is configured to notify the user of an electronic device 104 that is low on power that a selected compatible electronic device 104 is willing and/or available to share power with the electronic device 104 that is low on power. The power sharing management module 608 can also be configured to facilitate further communication between a selected compatible electronic device 104 and the electronic device 104 that is low on power in response to receiving a positive response from a selected compatible electronic device 104 that indicates that the selected compatible electronic device 104 is available and/or is willing to share power and/or perform power sharing services with the electronic device 104 that is low on power. The further communications, in some embodiments, can include one or more further agreements and/or further information, as discussed elsewhere herein.

As discussed above, a positive response from a selected compatible electronic device 104 can include one or more further agreements and/or further information between the power sharing management module 308, the user of the electronic device 104 that is low in power, the user of the selected compatible electronic device 104, and/or the selected compatible electronic device 104. However, one or more of the power sharing management module 308, the user of the electronic device 104 that is low in power, the user of the selected compatible electronic device 104, and/or the selected compatible electronic device 104 may not agree to one or more of the further items/terms/agreements that may be included in the further communications, as discussed elsewhere herein.

In some embodiments, the user of the electronic device 104 that is low on power and/or the power sharing management module 308 can be presented with the terms for providing the power sharing services that the owner/user of the selected compatible electronic device 104 is requesting prior to agreeing to the power sharing services. Here, the user of the electronic device 104 that is low on power and/or the power sharing management module 308 can decline to enter an agreement for power sharing services.

In certain embodiments, the power sharing management module 608, in response to the electronic device 104 that is low on power and a selected compatible electronic device 104 failing to enter into an agreement for power sharing services, is configured to wait for responses from one or more other selected compatible electronic devices 104 (e.g., one or more subsequently and/or alternatively selected compatible electronic devices 104) and facilitate communication between the electronic device 104 that is low on power and the other selected compatible electronic device(s) 104 until an agreement for power sharing services is reached, as discussed elsewhere herein, which can take one or more additional iterations of their respective operations/functions.

In additional or alternative embodiments, the power sharing management module 608 is configured to notify the compatible device detection module 304 that an agreement for performing power sharing services has not been reached in response to the user of the electronic device 104 that is low on power and the selected compatible electronic device 104 failing to reach an agreement. Here, the compatible device detection module 604, the request module 606, and/or the power sharing management module 608 can perform their respective operations and/or functions, as discussed elsewhere herein, until an agreement is reached between the electronic device 104 that is low on power and a compatible electronic device 104, which can take one or more additional iterations of their respective operations and/or functions.

The power sharing management module 608, in some embodiments, is configured to wait for responses from other selected compatible electronic devices 104 (e.g., one or more subsequently and/or alternatively selected compatible electronic devices 104) in response to receiving a response (e.g., a negative response) from a first or initially selected compatible electronic device 104 that indicates that the selected compatible electronic device 104 (e.g., a first/initially selected compatible electronic device 104) is unavailable for power sharing services and/or is unwilling to share power with the electronic device 104 that is low on power. The power sharing management module 608 can receive responses from the subsequently/alternatively selected compatible electronic devices 104 until a compatible electronic device 104 (e.g., a subsequently/alternatively selected compatible electronic device 104) that is available and/or willing to perform power sharing services is located and performed, as discussed elsewhere herein, which can take one or more further iterations of their respective operations/functions.

In additional or alternative embodiments, the power sharing management module 308 is configured to notify the compatible device detection module 604 that the first/initially and/or one or more subsequently/alternatively selected compatible electronic device 104 is unavailable for power sharing services and/or is unwilling to share power with the electronic device 104 that is low on power in response to receiving a negative response from the first/initially selected compatible electronic device 104 and/or the subsequently/alternatively selected compatible electronic device(s) 104. Here, the compatible device detection module 604, the request module 606, and/or the power sharing management module 608 can perform their respective operations and/or functions, as discussed elsewhere herein, until a compatible electronic device 104 (e.g., a subsequently/alternatively selected compatible electronic device 104) that is available and/or willing to perform power sharing services is located and performed, which can take one or more further iterations of their respective operations/functions.

The power sharing management module 608, in various embodiments, is configured to notify the user the user of the selected compatible electronic device 104 when the power sharing services provided by the selected compatible electronic device 104 are complete. The power sharing management module 608 can be further configured to notify the user of the electronic device 104 that is (was) low on power and/or the user of the selected compatible electronic device 104 that payment/compensation (e.g., money, credits, etc.) is due to the user of the selected compatible electronic device 104 and/or that payment/compensation has been provided to the user of the selected compatible electronic device 104.

Referring back to FIG. 5A, a processor 504 may include any suitable non-volatile/persistent hardware and/or software configured to perform and/or facilitate performing functions and/or operations for managing power sharing in electronic devices 104. In various embodiments, the processor 504 includes hardware and/or software for executing instructions in one or more modules and/or applications that can perform and/or facilitate performing functions and/or operations for managing power sharing in electronic devices 104. The modules and/or applications executed by the processor 504 for managing power sharing in electronic devices 104 can be stored on and executed from a memory device 502 and/or from the processor 504.

Figure 7A:
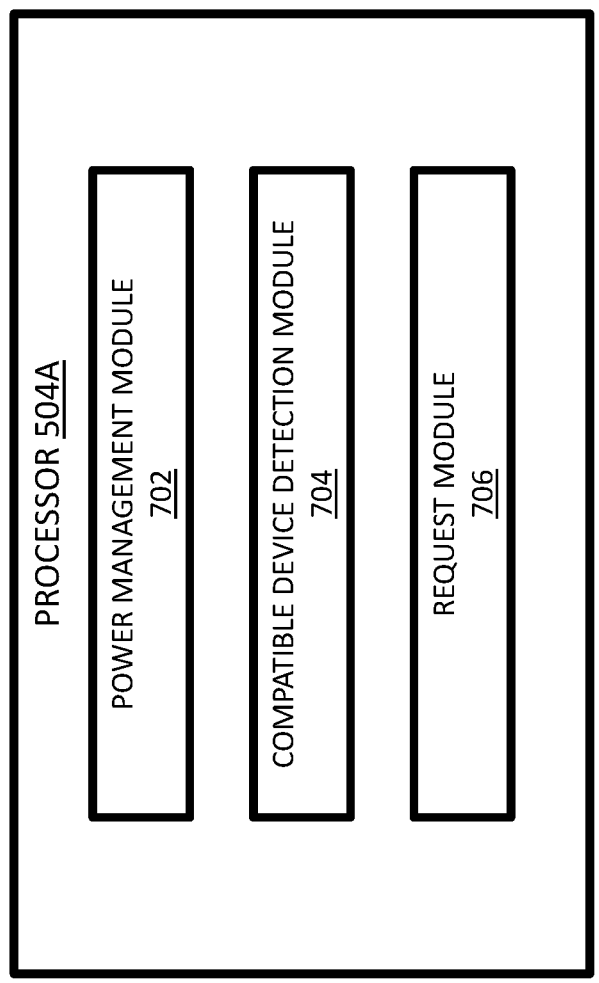
FIGS. 7A and 7B are schematic block diagrams of various embodiments of a processor included in the hosts of FIGS. 5A and 5B.

With reference to FIG. 7A, FIG. 7A is a schematic block diagram of one embodiment of a processor 504A. At least in the illustrated embodiment, the processor 504A includes, among other components, a power module 702, a compatible device detection module 704, and a request module 706 similar to the power module 602, compatible device detection module 604, and request module 606 in the memory device 502A discussed with reference to FIG. 6A.

Figure 7B:
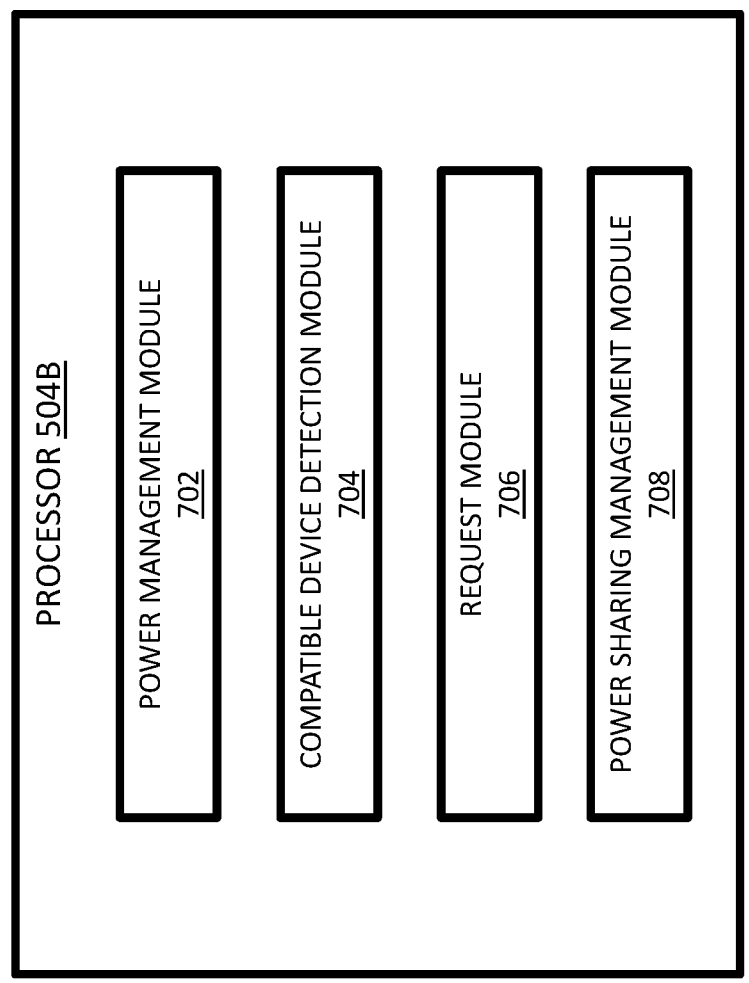

Referring to FIG. 7B, FIG. 7B is a schematic block diagram of another embodiment of a processor 504B. At least in the illustrated embodiment, the processor 504B includes, among other components, a power module 702, a compatible device detection module 704, a request module 706, and a power sharing management module 708 similar to the power module 602, compatible device detection module 604, request module 606, and power sharing management module 608 in the memory device 502B discussed with reference to FIG. 6B.

Figure 5B:
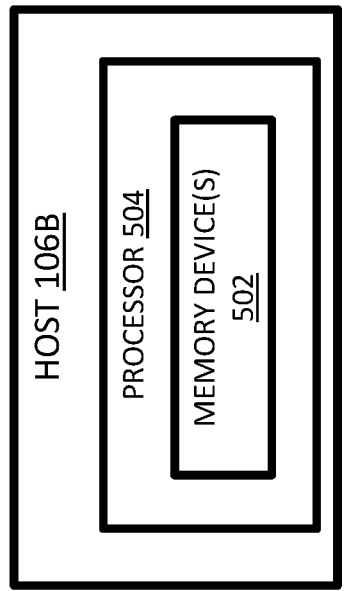

Turning now to FIG. 5B, FIG. 5B is a block diagram of another embodiment of a host 106B. The host 106B includes, among other components, a memory 502 and a processor 504. Alternative to the electronic device 104A, the processor 502 in the host 106B includes the memory device 502 as opposed to the memory device 502 of the host 106A being a different device than and/or independent of the processor 504.

Figure 8:
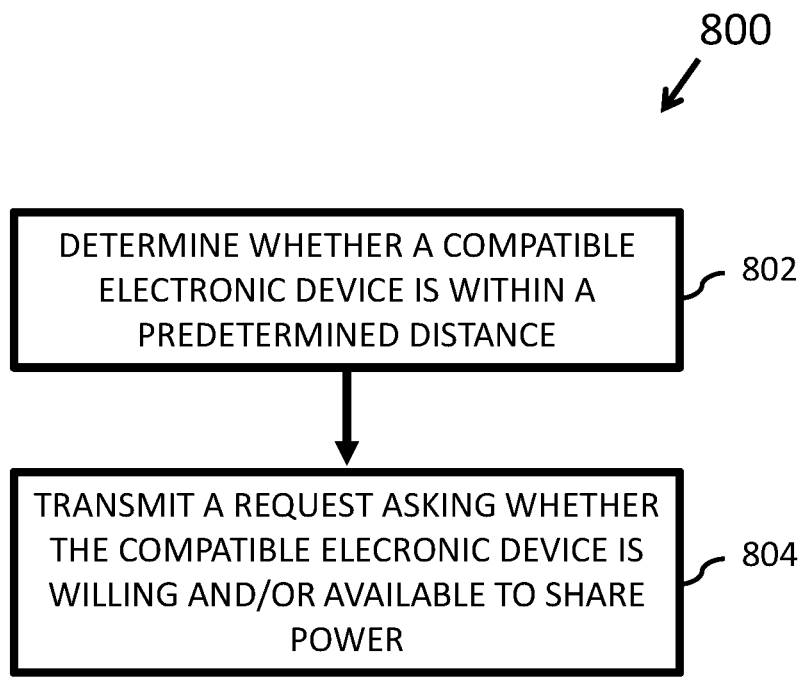
FIGS. 8 through 11 are flow diagrams of various embodiments of methods for managing power sharing in electronic devices.

FIG. 8 is a schematic flow chart diagram illustrating one embodiment of a method 800 for managing power sharing in electronic devices 104. At least in the illustrated embodiment, the method 800 begins by a processor (e.g., processor 206 or 504) determining or detecting whether one or more electronic devices 104 that are compatible with an electronic device 104 that is low on power is/are within a predetermined distance of the electronic device 104 that is low on power (block 802). In some embodiments, determining or detecting the one or more electronic devices 104 includes determining/detecting that the electronic devices 104 include greater than a predetermined amount of power capable of being shared with the electronic device 104 that is low on power, which can be any suitable amount of power, as discussed elsewhere herein.

In response to detecting one or more compatible electronic devices 104 that is/are within the predetermined distance, the processor transmits a request to one or more of the compatible electronic devices 104 that is/are within the predetermined distance inquiring whether the compatible electronic device(s) 104 are willing to share power with the electronic device 104 that is low on power (block 804). In some embodiments, the processor transmits the request to the compatible electronic devices 104 that are within the predetermined distance and include at least the predetermined amount of power.

Figure 9:
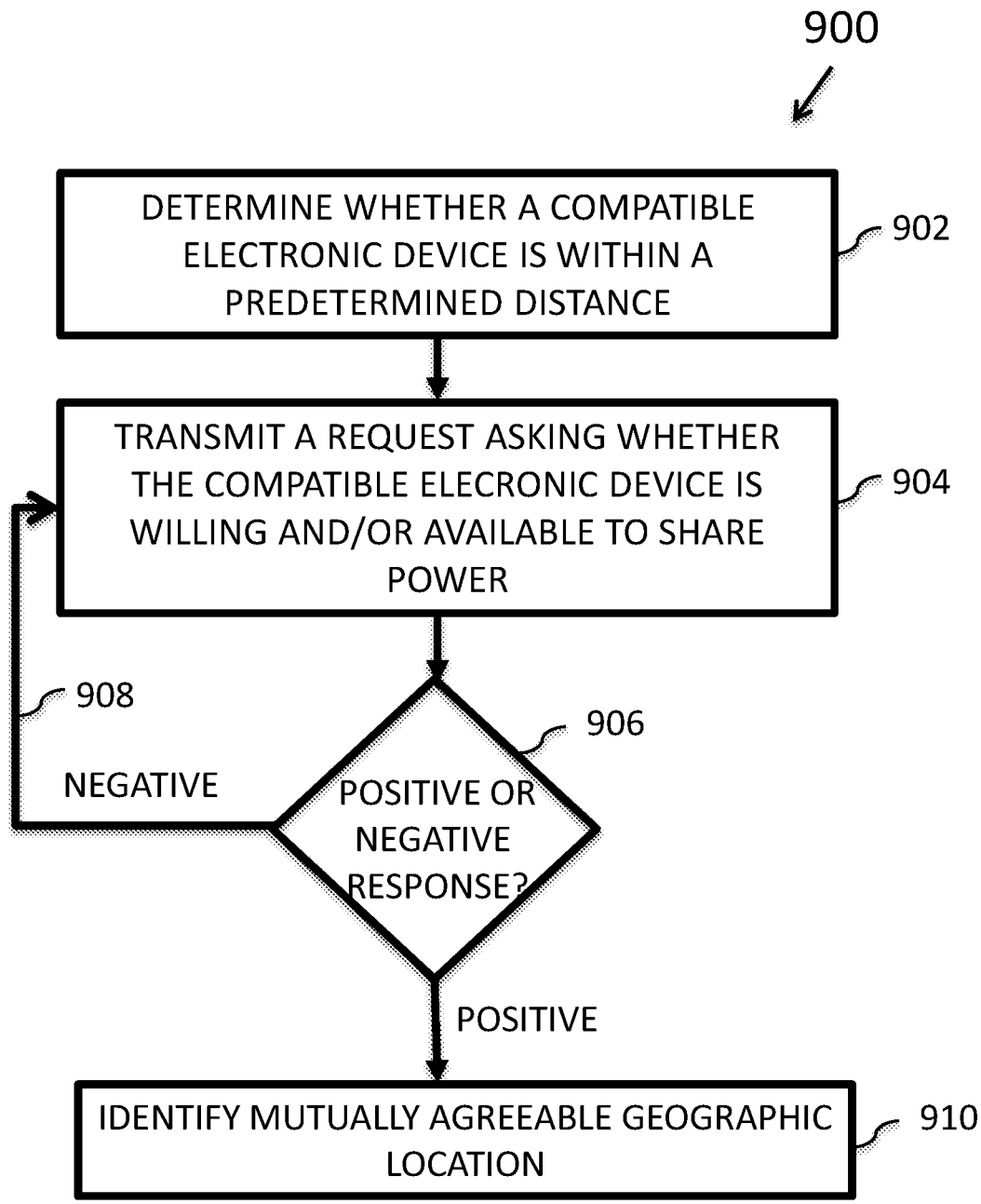

FIG. 9 is a schematic flow chart diagram illustrating another embodiment of a method 900 for managing power sharing in electronic devices 104. At least in the illustrated embodiment, the method 900 begins by a processor (e.g., processor 206 or 504) determining or detecting whether one or more electronic devices 104 that are compatible with an electronic device 104 that is low on power is/are within a predetermined distance of the electronic device 104 that is low on power (block 902). In response to detecting one or more compatible electronic devices 104 that is/are within the predetermined distance, the processor transmits a request to one of the compatible electronic devices 104 that is within the predetermined distance inquiring whether the compatible electronic device(s) 104 are willing to share power with the electronic device 104 that is low on power (block 904) and receiving a positive or negative response therefrom (block 906).

In response to receiving a negative response, the processor returns to block 904 to transmit the request to one or more others of the compatible electronic devices 104 that is/are within the predetermined distance (return 908). In response to receiving a positive response, the processor can identify a mutually agreeable geographic location for sharing power (block 910).

Figure 10:
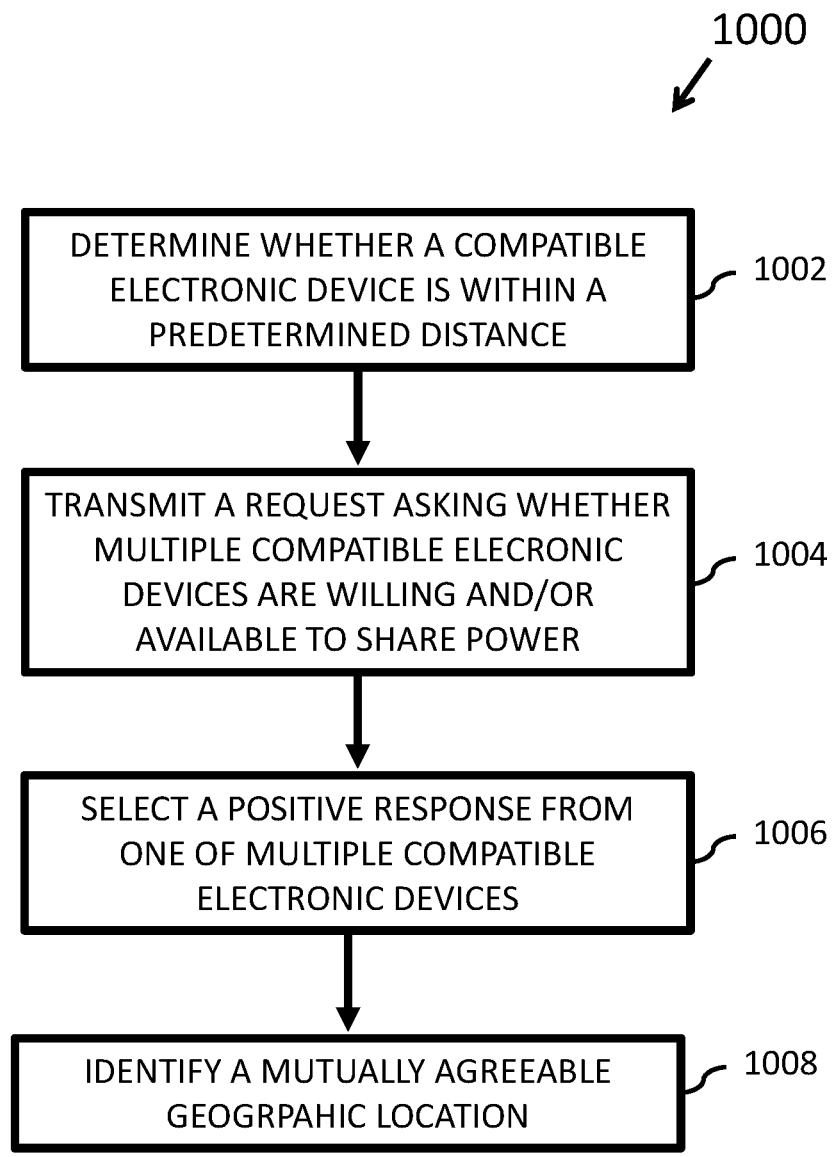

FIG. 10 is a schematic flow chart diagram illustrating another embodiment of a method 1000 for managing power sharing in electronic devices 104. At least in the illustrated embodiment, the method 1000 begins by a processor (e.g., processor 206 or 504) determining or detecting whether one or more electronic devices 104 that are compatible with an electronic device 104 that is low on power is/are within a predetermined distance of the electronic device 104 that is low on power (block 1002). In response to detecting two or more compatible electronic devices 104 that are within the predetermined distance, the processor transmits a request to each of the compatible electronic devices 104 that are within the predetermined distance inquiring whether the compatible electronic devices 104 are willing to share power with the electronic device 104 that is low on power (block 1004).

In response to receiving a positive response from multiple compatible electronic devices 104, the processor is configured to select one of the compatible electronic devices 104 for performing the power sharing services (block 1006). The selection may be based on any suitable factor(s) and/or criteria/criterion, as discussed elsewhere herein. The processor can then identify a mutually agreeable geographic location for sharing power (block 1008).

Figure 11:
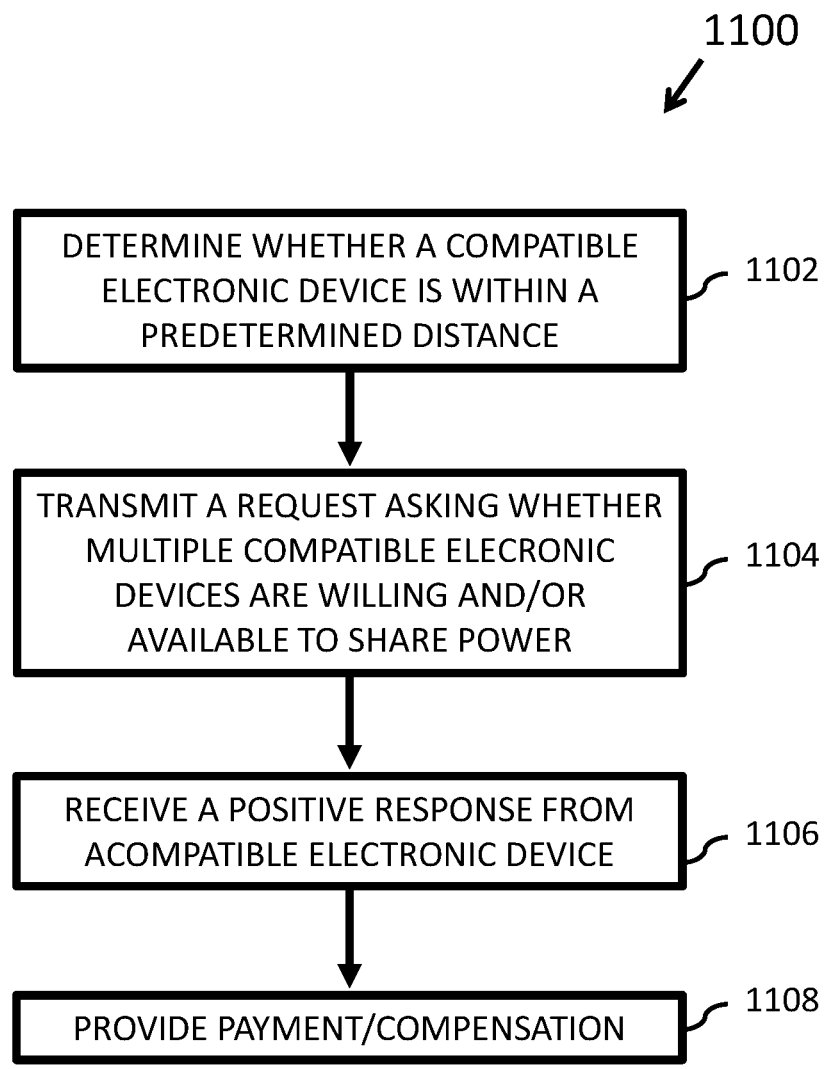

FIG. 11 is a schematic flow chart diagram illustrating yet another embodiment of a method 1100 for managing power sharing in electronic devices 104. At least in the illustrated embodiment, the method 1100 begins by a processor (e.g., processor 206 or 504) determining or detecting whether one or more electronic devices 104 that are compatible with an electronic device 104 that is low on power is/are within a predetermined distance of the electronic device 104 that is low on power (block 1102).

In response to detecting one or more compatible electronic devices 104 that is/are within the predetermined distance, the processor transmits a request to one or more of the compatible electronic devices 104 that is/are within the predetermined distance inquiring whether the compatible electronic device 104 is willing to share power with the electronic device 104 that is low on power (block 1104). The processor can receive a positive response (block 1106) and can provide payment/compensation to the compatible electronic device 104 at completion of the power sharing services (block 1108).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
  determine, in real-time, that a plurality of first mobile electronic devices that are compatible with a second mobile electronic device that is low on power are within a predetermined geographic distance of the second mobile electronic device,
  transmit a request to each first mobile electronic device of the plurality of first mobile electronic devices inquiring whether any of the plurality of first mobile electronic devices are willing to share power with the second mobile electronic device, and
  receive a respective response of a set of possible responses from each of two or more first mobile electronic devices of the plurality of first mobile electronic devices indicating whether each of the two or more first mobile electronic devices of the plurality of first mobile electronic devices is willing to share power with the second mobile electronic device,
  wherein:
    the set of possible responses comprises a positive response and a negative response, and
    each respective response comprises one of the positive response or the negative response.

2. The apparatus of claim 1, wherein the code is further executable by the processor to:
identify a mutually acceptable geographic location for a first mobile electronic device of the plurality of first mobile electronic devices that is willing to share power with the second mobile electronic device and the second mobile electronic device to meet to share the power in response to receiving the positive response from the first mobile electronic device of the plurality of first mobile electronic devices that is willing to share power with the second mobile electronic device.

3. The apparatus of claim 2, wherein, in response to receiving the positive response from the two or more first mobile electronic devices of the plurality of first mobile electronic devices that are willing to share power with the second mobile electronic device, the code is further executable by the processor to:
present each of the two or more first mobile electronic devices to the second mobile electronic device for selection;
receive a selected first mobile electronic device from the second mobile electronic device; and
identify a mutually acceptable geographic location for the selected first mobile electronic device and the second mobile electronic device.

4. The apparatus of claim 1, wherein:
determining that the two or more first mobile electronic devices are within the predetermined distance of the second mobile electronic device further comprises determining whether each of the two or more first mobile electronic devices includes an amount of power greater than a threshold amount of power; and
in response to determining that the two or more first mobile electronic devices within the predetermined distance of the second mobile electronic device also includes greater than the threshold amount of power, transmitting the request to each of the two or more first mobile electronic devices inquiring whether any of the two or more first mobile electronic devices are willing to share the power with the second mobile electronic device.

5. The apparatus of claim 1, wherein the code is further executable by the processor to:
receive a notice that a first mobile electronic device of the plurality of first mobile electronic devices provided an amount of power to the second mobile electronic device.

6. The apparatus of claim 5, wherein the code is further executable by the processor to:
provide compensation to the first mobile electronic device that provided the amount of power to the second mobile electronic device,
wherein the compensation comprises one of a predetermined amount of compensation and an amount of compensation based on the amount of power shared by the first mobile electronic device.

7. The apparatus of claim 1, wherein:
the second mobile electronic device comprises one of a vehicle or a portable electronic device; and
the apparatus is located on a host computing device that is separate from the second mobile electronic device or is located on the one of the vehicle or the portable electronic device.

8. A method, comprising:
determining, in real-time by a processor, that a plurality of first mobile electronic devices that are compatible with a second mobile electronic device that is low on power are within a predetermined geographic distance of the second mobile electronic device;
transmitting a request to each first mobile electronic device of the plurality of first mobile electronic devices inquiring whether any of the plurality of first mobile electronic devices are willing to share power with the second mobile electronic device; and
receiving a respective response of a set of possible responses from each of two or more first mobile electronic devices of the plurality of first mobile electronic devices indicating whether each of the two or more first mobile electronic devices of the plurality of first mobile electronic devices is willing to share power with the second mobile electronic device,
wherein:
  the set of possible responses comprises a positive response and a negative response, and each respective response comprises one of the positive response or the negative response.

9. The method of claim 8, further comprising:
identifying a mutually acceptable geographic location for a first mobile electronic device of the plurality of first mobile electronic devices and the second mobile electronic device to meet to share the power in response to receiving the positive response from the first mobile electronic device of the plurality of first mobile electronic devices that is willing to share power with the second mobile electronic device.

10. The method of claim 9, wherein, in response to receiving the positive response from the two or more first mobile electronic devices of the plurality of first mobile electronic devices that are willing to share power with the second mobile electronic device, the method further comprises:
presenting each of the two or more first mobile electronic devices to the second mobile electronic device for selection;
receiving a selected first mobile electronic device from the second mobile electronic device; and
identifying the mutually acceptable geographic location for the selected first mobile electronic device and the second mobile electronic device.

11. The method of claim 8, wherein:
determining that the two or more first mobile electronic devices are within the predetermined distance of the second mobile electronic device further comprises determining whether each of the two or more first mobile electronic devices includes an amount of power greater than a threshold amount of power; and
in response to determining that the two or more first mobile electronic devices within the predetermined distance of the second mobile electronic device also includes greater than the threshold amount of power, transmitting the request to each of the two or more first electronic devices inquiring whether any of the two or more first mobile electronic devices are willing to share the power with the second mobile electronic device.

12. The method of claim 8, further comprising:
receiving a notice that a first mobile electronic device of the plurality of first mobile electronic devices provided an amount of power to the second mobile electronic device.

13. The method of claim 12, further comprising:
providing compensation to the first mobile electronic device that provided the amount of power to the second mobile electronic device,
wherein the compensation comprises one of a predetermined amount of compensation and an amount of compensation based on the amount of power shared by the first mobile electronic device.

14. The method of claim 8, wherein:
the second mobile electronic device comprises one of a vehicle or a portable electronic device; and
the processor is located on a host computing device that is separate from the second mobile electronic device or is located on the one of the vehicle or the portable electronic device.

15. A computer program product comprising a non-transitory computer-readable storage medium including code embodied therewith, the code executable by a processor to cause the processor to:
determine, in real-time, that a plurality of first mobile electronic devices that are compatible with a second mobile electronic device that is low on power are within a predetermined geographic distance of the second mobile electronic device; and
transmit a request to each first mobile electronic device of the plurality of first mobile electronic devices inquiring whether any of the plurality of first mobile electronic devices are willing to share power with the second mobile electronic device; and
receive a respective response from a set of possible responses from each of two or more first mobile electronic devices of the plurality of first mobile electronic devices indicating whether each of the two or more first mobile electronic devices of the plurality of first mobile electronic devices is willing to share power with the second mobile electronic device,
wherein:
the set of possible responses comprises a positive response and a negative response, and
each respective response comprises one of the positive response or the negative response.

16. The computer program product of claim 15, wherein the executable code further causes the processor to:
identify a mutually acceptable geographic location for a first mobile electronic device of the plurality of first mobile electronic devices that is willing to share power with the second mobile electronic device and the second mobile electronic device to meet to share the power in response to receiving the positive response from the first mobile electronic device of the plurality of first mobile electronic devices that is willing to share power with the second mobile electronic device.

17. The computer program product of claim 16, wherein, in response to receiving the positive response from the two or more first electronic devices of the plurality of first mobile electronic devices that are willing to share power with the second mobile electronic device, the executable code further causes the processor to:
present each of the two or more first mobile electronic devices to the second mobile electronic device for selection;
receive a selected first mobile electronic device from the second mobile electronic device; and
identify the mutually acceptable geographic location for the selected first mobile electronic device and the second mobile electronic device.

18. The computer program product of claim 15, wherein:
the executable code that causes the processor to determine that the two or more first mobile electronic devices are within the predetermined distance of the second mobile electronic device further comprises executable code that causes the processor to determine whether each of the two or more first mobile electronic devices includes an amount of power greater than a threshold amount of power; and
in response to determining that the two or more first mobile electronic devices within the predetermined distance of the second mobile electronic device also includes greater than the threshold amount of power, the executable code further causes the processor to transmit the request to each of the two or more first electronic devices inquiring whether any of the two or more first mobile electronic devices are willing to share the power with the second mobile electronic device.

19. The computer program product of claim 15, wherein the executable code further causes the processor to:

receive a notice that a first mobile electronic device of the plurality of first mobile electronic devices provided an amount of power to the second mobile electronic device; and provide compensation to the first mobile electronic device that provided the amount of power to the second mobile electronic device, wherein the compensation comprises one of a predetermined amount of compensation and an amount of compensation based on the amount of power shared by the first mobile electronic device.

20. The computer program product of claim 15, wherein:

the second mobile electronic device comprises one of a vehicle or a portable electronic device; and the processor is located on a host computing device that is separate from the second mobile electronic device or is located on the one of the vehicle or the portable electronic device.

* * * * *